United States Patent
Ragnet et al.

(10) Patent No.: US 9,955,009 B2
(45) Date of Patent: Apr. 24, 2018

(54) PRESCRIPTIVE ANALYTICS FOR CUSTOMER SATISFACTION BASED ON AGENT PERCEPTION

(71) Applicant: Xerox Corporation, Norwalk, CT (US)

(72) Inventors: Francois Ragnet, Venon (FR); Stefania Castellani, Meylan (FR); Benjamin Vincent Hanrahan, Grenoble (FR); Yves Hoppenot, Notre-Dame-de Mesage (FR)

(73) Assignee: Conduent Business Services, LLC, Dallas, TX (US)

( * ) Notice: Subject to any disclaimer, the term of this patent is extended or adjusted under 35 U.S.C. 154(b) by 361 days.

(21) Appl. No.: 14/510,602

(22) Filed: Oct. 9, 2014

(65) Prior Publication Data

US 2016/0105559 A1 Apr. 14, 2016

(51) Int. Cl.
*H04M 3/51* (2006.01)
*G06Q 10/06* (2012.01)

(52) U.S. Cl.
CPC .... *H04M 3/5175* (2013.01); *G06Q 10/06398* (2013.01); *H04M 2203/555* (2013.01)

(58) Field of Classification Search
CPC .......... H04M 3/5175; H04M 2203/555; G06Q 10/06398
See application file for complete search history.

(56) References Cited

U.S. PATENT DOCUMENTS

| | | | |
|---|---|---|---|
| 6,049,779 A | 4/2000 | Berkson | |
| 7,761,321 B2 | 7/2010 | Kannan et al. | |
| 8,396,741 B2 | 3/2013 | Kannan et al. | |
| 8,565,411 B2 | 10/2013 | Kannan et al. | |
| 2006/0233349 A1* | 10/2006 | Cooper | H04M 3/5175 379/265.06 |
| 2007/0208575 A1* | 9/2007 | Habichler | G06Q 10/06398 705/7.42 |

(Continued)

FOREIGN PATENT DOCUMENTS

WO  WO 2013/055367 A1  4/2013

OTHER PUBLICATIONS

Chanel, G. et al., "Boredom, Engagement and Anxiety as Indicators for Adaptation to Difficulty in Games," MindTrek '08 (Oct. 7-9, 2008), Tampere, Finland, pp. 13-17.

(Continued)

*Primary Examiner* — Harry S Hong
(74) *Attorney, Agent, or Firm* — Kermit D. Lopez; Luis M. Ortiz; Ortiz & Lopez, PLLC

(57) ABSTRACT

Methods and systems determining customer satisfaction in a work environment via prescriptive analytics. Self-reported data related to the perception of an agent with respect to customer satisfaction in a work environment (e.g., a call center) can be collected via an interface (e.g., an agent dashboard) that allows the agent to enter the self-reported data regarding the customer satisfaction. The self-reported data can then be correlated with an actual customer satisfaction score associated with the agent to derive data indicative of an interaction between the agent and a customer(s). Feedback data can then be provided via the interface indicating a correctness of the self-reported data based on correlating the self-reported data with the actual customer satisfaction score.

20 Claims, 7 Drawing Sheets

(56) References Cited

U.S. PATENT DOCUMENTS

| | | |
|---|---|---|
| 2009/0222313 A1 | 9/2009 | Kannan et al. |
| 2010/0138282 A1* | 6/2010 | Kannan ................. G06Q 30/02 |
| | | 705/7.42 |
| 2012/0016716 A1 | 1/2012 | Bai et al. |
| 2012/0102043 A1 | 4/2012 | Verma |
| 2012/0130771 A1 | 5/2012 | Kannan et al. |
| 2013/0077768 A1 | 3/2013 | Pearce et al. |
| 2013/0142322 A1 | 6/2013 | Grasso et al. |
| 2014/0192970 A1 | 7/2014 | Castellani et al. |
| 2014/0376707 A1* | 12/2014 | Pearce ................ H04M 3/5175 |
| | | 379/265.03 |
| 2016/0065741 A1* | 3/2016 | Mezhibovsky ..... H04M 3/5233 |
| | | 379/265.12 |

OTHER PUBLICATIONS

Hunicke, R., "The Case for Dynamic Difficulty Adjustment in Games," ACE '05 Proceedings of the 2005 ACM SIGCHI International Conference on Advances in computer entertainment technology, New York, NY, pp. 429-433.

* cited by examiner

PRESCRIPTIVE ANALYTICS FOR CUSTOMER SATISFACTION BASED ON AGENT PERCEPTION

FIELD OF THE INVENTION

Embodiments are generally related to work environments such as call centers and the management of competition in such work environments. Embodiments are additionally related to prescriptive analytics and assessment metrics for measuring and quantifying customer satisfaction. Embodiments are also related to interfaces such as user interfaces utilized in work environments.

BACKGROUND

Work environments such as call centers (and their agents) are typically evaluated on their level of compliance to service level agreements (SLAs). This level of compliance is based on a number of quantitative metrics, referred to as key performance indicators (KPIs), (e.g., the average handle time (AHT) for handling a call), and quality assessment metrics, referred to in some cases as Called Customer SATisfaction (CSAT). CSAT is a satisfaction score that is gathered sporadically by having customers fill out a survey some period of time after the call ends. The surveys are based on a follow-up survey performed by a third party with respect to a sample of calls, or collected automatically through an IVR (Interactive Voice Response) device.

CSAT is a key metric employed for call centers today. A CSAT value reflects how satisfied a customer is with the company. Another very closely related metric is Net Promoter Score (NPS), which indicates the likeliness that an end customer is willing to recommend the company to others. Call/service center businesses pay very close attention to this metric because it is a key differentiator in the commoditized call center business.

Agents are also evaluated by quality assurance (QA) officers, who replay recorded calls typically on a weekly basis and evaluate them in a detailed manner based on a number of categories related to policy adherence, system use, technical capabilities, soft skills, and so forth. This score is usually a percentage and agents typically must score between 95-100% to achieve acceptable levels of quality. This is often a KPI in the SLA.

Unfortunately, CSAT is very difficult to collect, mainly because so few customers respond to the survey requests. Other quality KPIs based on similar evaluations, which require time and expertise, suffer a similar fate. In addition, quality metrics including CSAT are also strong indicators to manage a team (auto motivation, training plan, etc.), but the infrequency of the data makes it difficult to use, especially when call difficulty varies over time.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide methods and systems for determining customer satisfaction in a work environment via prescriptive analytics.

It is another aspect of the disclosed embodiments to provide methods and systems that allow agents in call centers to express and evaluate their impression and/or understanding about the quality of their interactions with customers during their calls.

It is yet another aspect of the disclosed embodiments to provide methods and systems for collecting the perception of an agent regarding how he or she handled a customer during a call and deriving data indicative of the customer's "satisfaction" with respect to that call.

It is still another aspect of the disclosed embodiments to match such data to a full sample of real data.

The aforementioned aspects and other objectives and advantages can now be achieved as described herein. Methods and systems are disclosed for determining customer satisfaction in a work environment via prescriptive analytics. Self-reported data related to the perception of an agent with respect to customer satisfaction in a work environment (e.g., a call center) can be collected via an interlace (e.g., an agent dashboard) that allows the agent to enter the self-reported data regarding the customer satisfaction. The self-reported data can then be correlated with an actual customer satisfaction score associated with the agent to derive data indicative of an interaction between the agent and a customer(s). Feedback data can then be provided via the interface indicating the correctness of the self-reported data based on correlating the self-reported data with the actual customer satisfaction score.

The agent can be prompted to enter the self-reported data via the interface during a call with the customer or immediately after the call with the customer. The agent can also be prompted to enter the self-reported data via the interface during a predetermined time interval. In some embodiments, a step or operation can be implemented for automatically analyzing the feedback data associated with the agent with respect to feedback data associated with at least one other agent to provide an overall customer satisfaction score for the work environment. In another embodiment, a step or logical operation can be implemented for selecting one or more referee agents associated with the work environment by analyzing the overall customer satisfaction score.

The disclosed approach allows agents in call centers to express and evaluate their impression/understanding about the quality of their interactions with the customers (CSAT) during their calls comparing them against the reality in order to provide the agents with feedback about their own CSAT perception to let them re-evaluate/adjust their estimation. This approach additionally allows for a more complete collection of data on CSAT per call from the agents with a confidence score and therefore obtain enhanced call center quality evaluation data. A proactive auto escalation of low CSAT call can be implemented based on this self-perceived CSAT. For example, if a customer is left with a low satisfaction metric, only a very quick turnaround can win him or her back as a customer. The capability of detecting low-CSAT calls immediately can lead to corrective actions more rapidly (e.g., calling the customer back with a promotional offer or other information). This approach also detects agents more capable to self-assess CSAT correctly and employ them as "coaches" or referee agents in call centers for the agents that are less capable to assess this, and thus enhance agent capabilities and retention.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
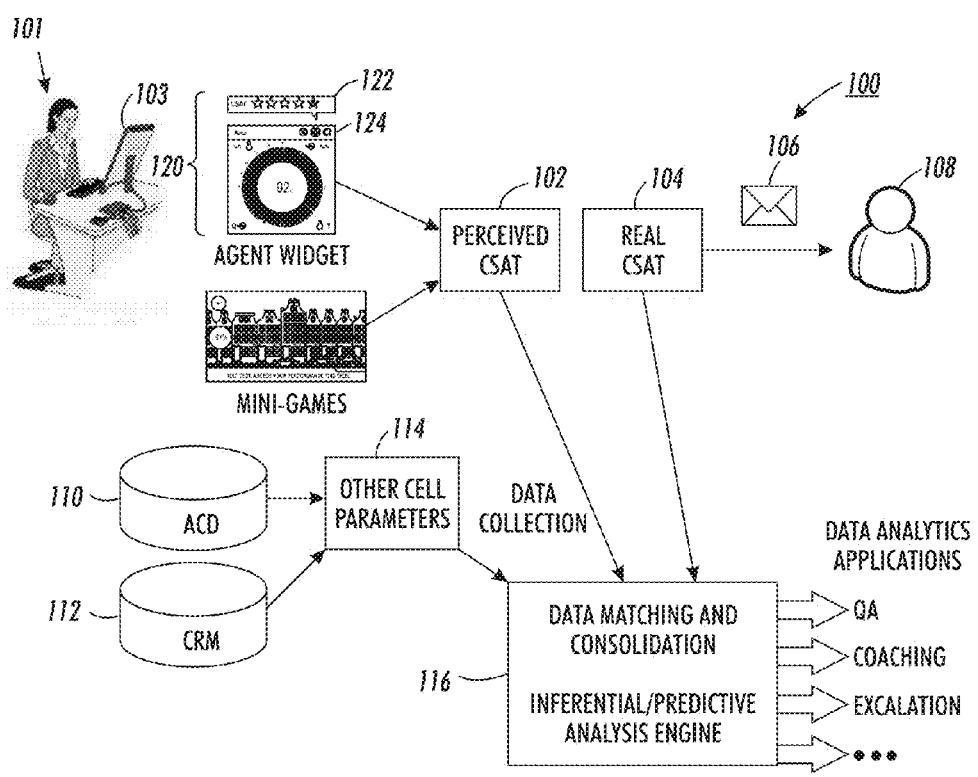
FIG. 1 illustrates a functional block diagram of a prescriptive analytics system, in accordance with a preferred embodiment.

FIG. 1 illustrates a functional block diagram of a prescriptive analytics system 100, in accordance with a preferred embodiment. Note that in the figures discussed herein, identical or similar parts or features are generally identified by identical reference numerals. As shown in FIG. 1, an agent in a work environment can view an interface 120 via a computer display 103. The approach of system 100 shown in FIG. 1 allows the agent 101 to express and evaluate his or her impression/understanding about the quality (e.g., CSAT) of his or her interactions with a customer 108 during a call with the customer and to compare this evaluation against "reality" in order to provide agents with feedback regarding their own CSAT perception to let them re-evaluate/adjust their estimation while obtaining a more complete collection of data on CSAT per call from the agents with a confidence score for a better call centre quality evaluation.

System 100 generally allows for the proactive auto escalation of low CSAT calls based on this self-perceived CSAT (e.g., if a customer is left with a low satisfaction metric, only a very quick turnaround can win that customer back). The capability of detecting low-CSAT calls immediately can lead to corrective actions more rapidly (e.g., calling the customer back with promotional offer or other). System 100 further detects those agents more capable to self-assess CSAT correctly and use them as "coaches" in call centres for the agents that are less capable of making a proper assessment.

Figure 2:
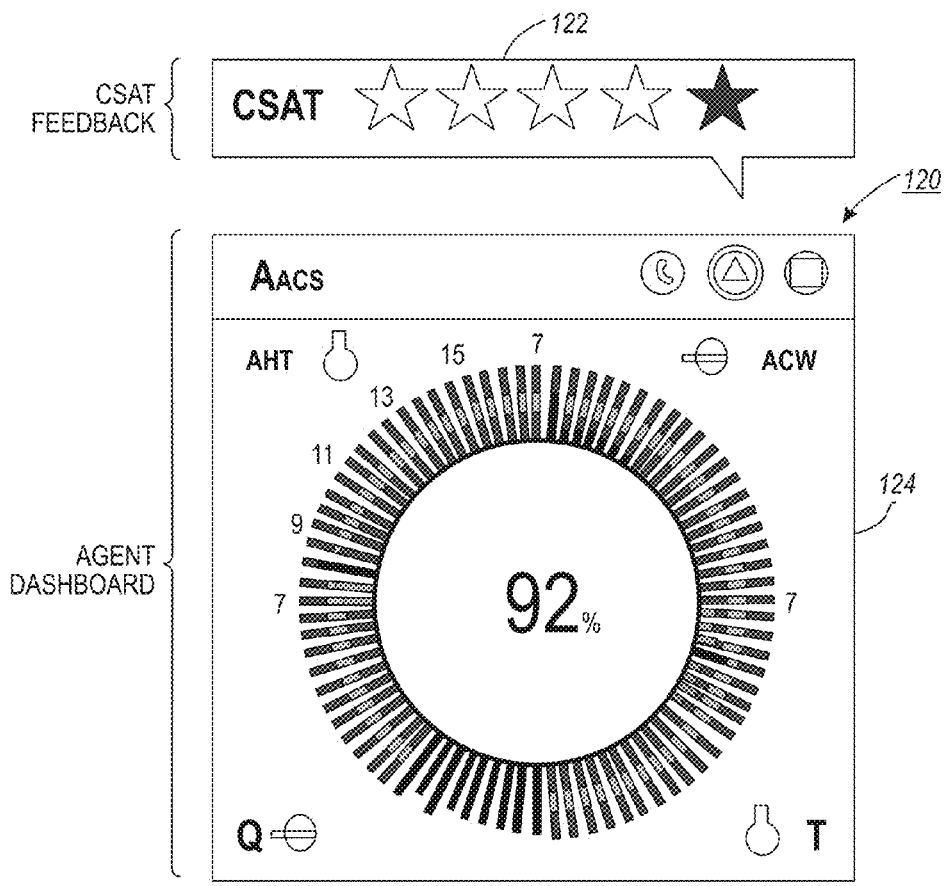
FIG. 2 illustrates a schematic diagram depicting an agent widget with a feedback screen, in accordance with a preferred embodiment.

Thus, as shown in FIG. 1, the agent 101 can generate perceived CSAT 102 data via the interface 120, which is discussed in greater detail in FIG. 2. Real CSAT data 104 can be collected from the customer 108 and/or other sources and provided to a data matching and consolidation module 116 along with the perceived CSAT data 102. A database 110 can contain ACD (Automatic Call Distribution) information and a database 112 can include CRM (Customer Relationship Management) information. Data from databases 110 and/or 112 are incorporated with other call parameters 114 (e.g., ATT—Average Talk Time, AHT—Average Handle Time, call duration, call type, agent profile, etc.) and collected as shown at arrows and provided to the data matching and consolidation module 116, which functions as an inferential/predictive analytics engine. Data can then be output from module 116 and provide to various data analytics applications (e.g., QA, Coaching, Escalation, etc.).

A key element of system 100 involves the collection of the perception of the agent 103 regarding how the call that he or she handled with the customer 108 went and the "satisfaction" by the customer 108 with the call. The CSAT score is the result of the interaction between the agent 101 and the customer 108, so the agent 101 is the second person that can best estimate how satisfied the customer seemed. Hence, the need to obtain perceived CSAT data 102.

This collection can be mandatory or optional, with different frequencies, and can be proposed as "a mini-game". It can be collected at any granularity, from the single call to a day-level (although the recollection of the agent 101 may not be likely to be as good). A preferred collection mechanism would be implemented after each call to obtain as much data as possible.

A number of options can be implemented for data collection. For example, in one embodiment, systematic collection may occur as part of "after call work." That is, in this option for data collection, an agent such as agent 101 can be prompted to provide input regarding how much he or she believes the customer was satisfied with the quality of the call—as part of an "After Call Work" standard process that such agents typically follow. In a couple of "clicks" the agent can directly score the CSAT, between 0 (poor) and 5 (good), for example, and generate his or her perceived CSAT data 102 via the interface 120.

FIG. 2 illustrates a schematic diagram further depicting the interface 120 with its agent widget 124 (e.g., dashboard) with a feedback screen 122, in accordance with a preferred embodiment. The interface depicted in FIG. 2 is an example interface, which the agent 101 can employ to score CSAT within the agent widget for performance management.

The information is associated with the call information and can be employed later on for comparison with real CSAT data 104 coming from customer 108. This comparison can be accomplished as a t-test, where, for example, the previously mentioned 0-5 rating (of the calls that received a CSAT survey) by the agent 101 can be compared with the 'binned' CSAT scores of actual survey responses. An operations manager can define the boundaries of the bins. When the system 100 reports how successfully the agent 101 self-rated, the mean of both the self and customer ratings can be generated and displayed, as well as information rating if it was found to be significantly different (e.g., in terms of coloring—red or green).

Figure 3:
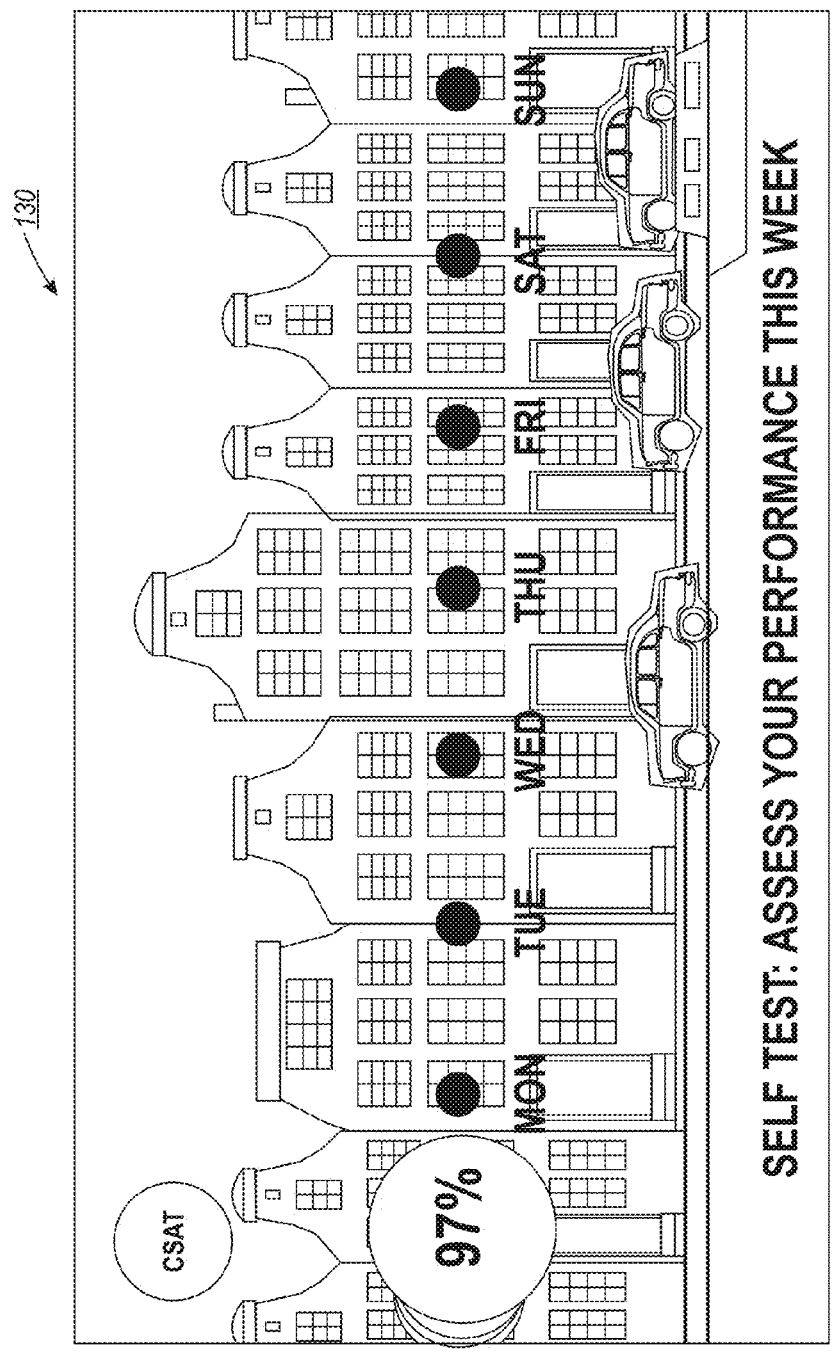
FIG. 3 illustrates a sample initial screen of a CSAT self-assessment game, which can be implemented in accordance with an alternative embodiment.

FIG. 3 illustrates an example initial screen 130 of a CSAT self-assessment game, which can be implemented in accordance with an alternative embodiment. If it is estimated to be too time-consuming in some contexts, the data collection can be accomplished on a less frequent basis and/or on a voluntary basis, and thus "gamified". Hence, the self-CSAT assessment mini-game screen 130 shown in FIG. 3 can be implemented. An example of such a gamification scenario may be the following. In the context of a mini-game, agents may be provided with questions or prompted to enter data on their mobile phone or other device (e.g., tablet computer), or on a break room screen, or online, to assess their performance regarding a particular period of time. This might occur on their break time, in which case a "gamification" aspect would allow for an additional incentive to participation. Thus, initial screen 130 of a CSAT self-assessment game can invite agents such as agent 101 to assess their performance over, for example, a week. Note that CSAT data of the past week may be not yet associated to a particular number of days.

Figure 4:
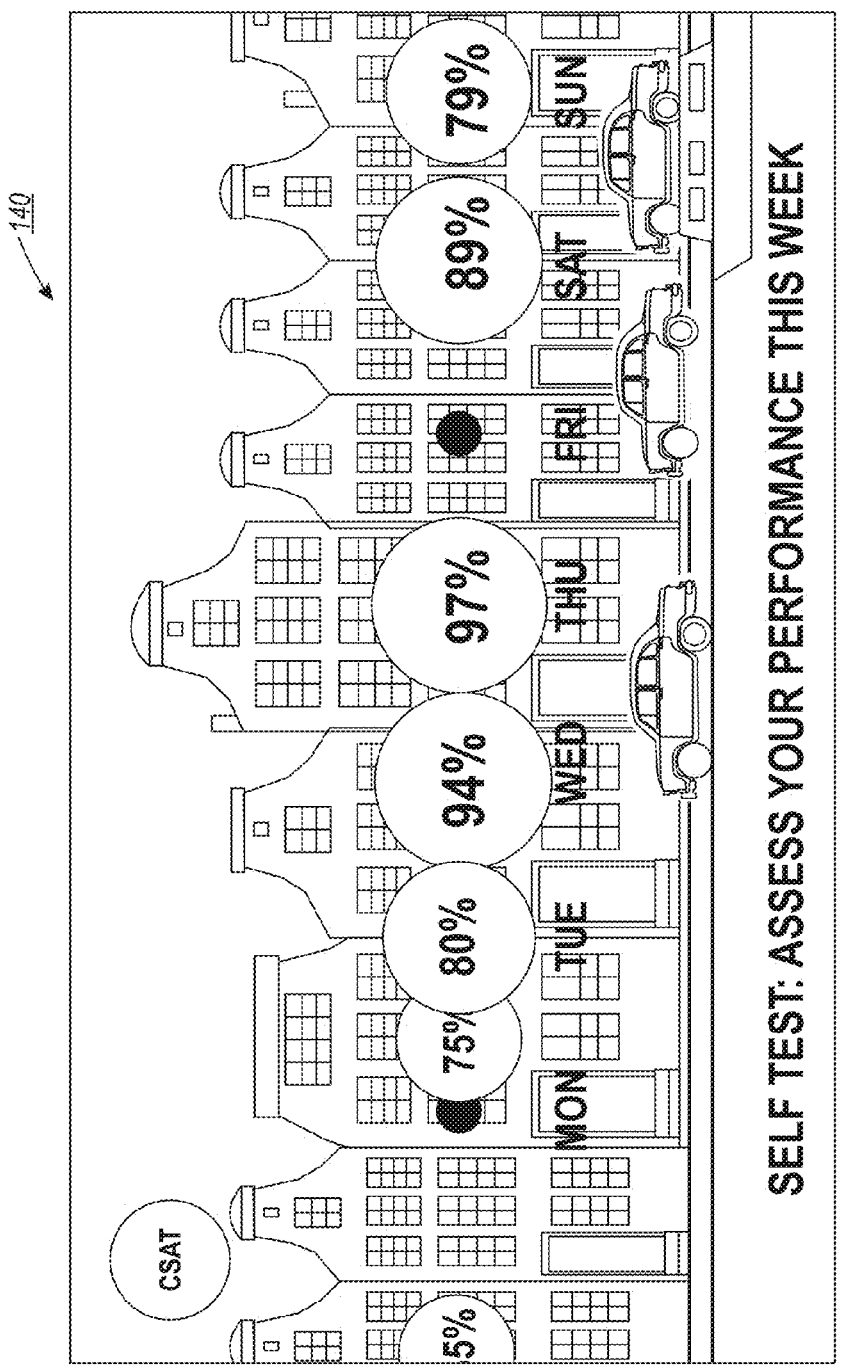
FIG. 4 illustrates a sample screen in which an agent is distributing CSAT values to days of past week in the context of a CSAT self-assessment game, in accordance with alternative embodiment.

FIG. 4 illustrates a sample screen 140 in which an agent is distributing CSAT values to days of past week in the context of CSAT self-assessment game, in accordance with an alternative embodiment. In the example scenario shown in FIG. 4, the CSAT data has been collected for the previous week, and the goal of the game is for the agent to self-assess their perception of CSAT against the actual measurement. Agents are able to match their self-perceived values of CSAT to the corresponding periods: e.g., here moving bubbles with values to express their perception of the day of the week (or hour of the day, call of the hour, etc.). In the example shown in AG. 4, the agent 101 may distribute his or her estimation of CSAT values (represented with colored circles) to days of the past week.

Figure 5:
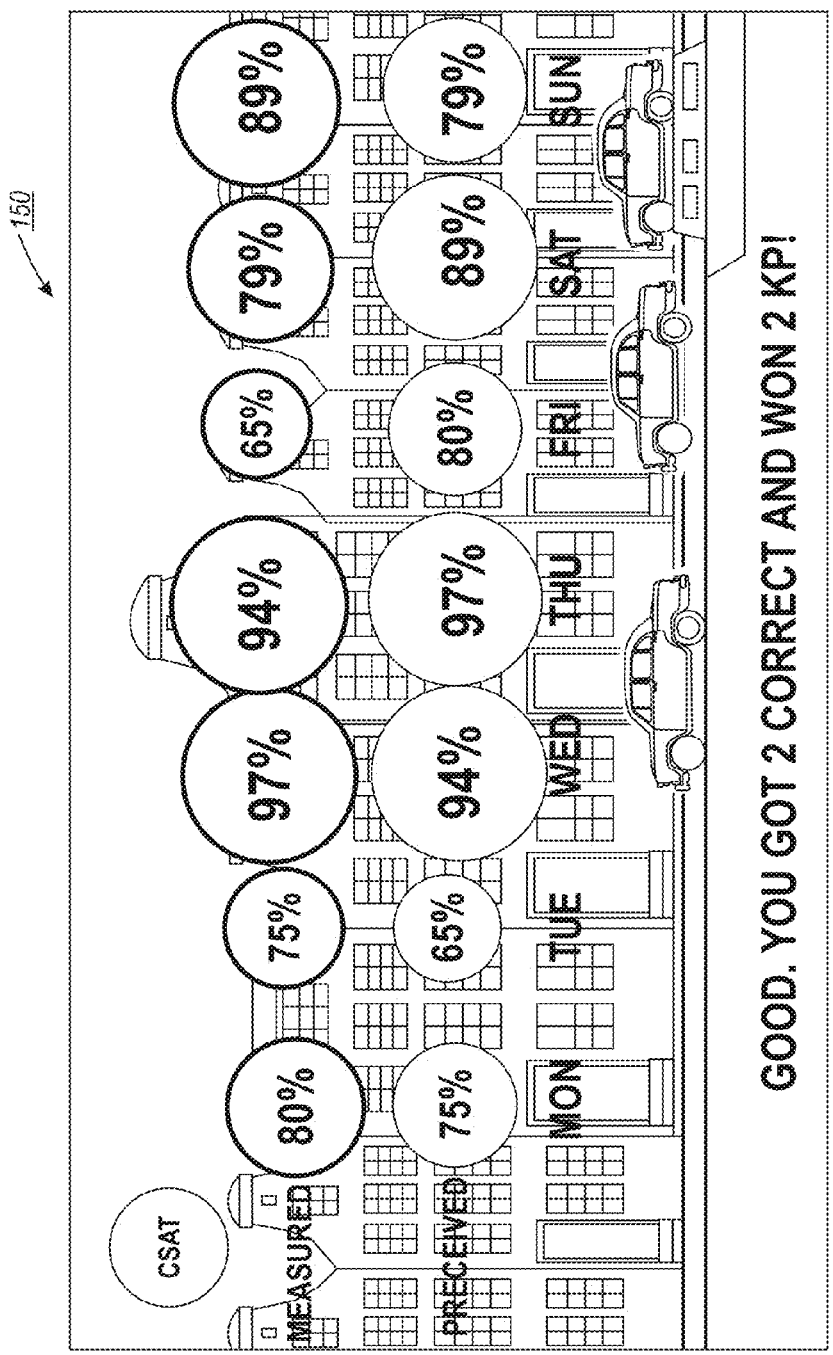
FIG. 5 illustrates an example screen displaying the results of a CSAT self-assessment game, in accordance with an alternative embodiment.

At the end of the mini-game, the agent is able to view her/his results and receive feedback on how well he or she did. An incentive system can be implemented to reward the agents who better perceived what happened in reality. He or she can earn experience points (XP) or "CSAT Empathy Hero" badges. FIG. 5 illustrates an example screen 150 displaying the results of a CSAT self-assessment game, in accordance with an alternative embodiment.

Data collected from agents as described in herein can be matched to the full sample of real data, collected from questionnaires with client, at the call level. In case of CSAT comparison as described previously herein, data from customers and agents can be aggregated at the same level, for a day, for the team, for the call centre or other. Based on this, a comparison function can be computed between the agent's prediction and the real, measured value—either with only that data, or correlating with other available data like the result of the quality assurance (QA) assessment performed by the QA Officer. This correlation will be accomplished by taking the averages for the different days and running a Pearsons correlation via, for example, the data matching and consolidation module 116. To report this correlation to the user, a plot of the two lines (i.e., their rating and the customers') can be displayed for the user with an indication of whether or not these are found to be similar.

Data analytics applications such as the applications shown in FIG. 1 can be employed. That is, based on the observed data, an alignment can be computed between the agent's prediction/perception (i.e., perceived CSAT data 102) and the real CSAT data or score 104. This data can be employed in a number of ways. First, such data can be used to provide the agent 101 with feedback about his or her CSAT perception (CSAT data 102) and allow the agent 101 to adjust his or her estimation. This feedback can be implemented or covered via, for example, the mini-game scenarios discussed previously.

Such data can also be used to provide a way to detect lack of skill in an agent (e.g, bad perceived quality with good confidence for specific skills of the call) and offer the agent an opportunity to become involved in a dedicated training regime with a team leader in the work environment. Such data can also be employed to identify those agents in the work environment having the best "empathy" with customers (i.e., best able to assess the customer's satisfaction). This information can be employed for different purposes. For example, agents with good CSAT can be identified and become "coaches" or trainers for other agents in call centers. Agents with good CSAT can become quality assessment agents in order to listen to other agents call to assess the call quality. Additionally, proactive escalation of bad CSAT calls can be implemented based on advanced analytics including this self-perceived CSAT.

Figure 6:
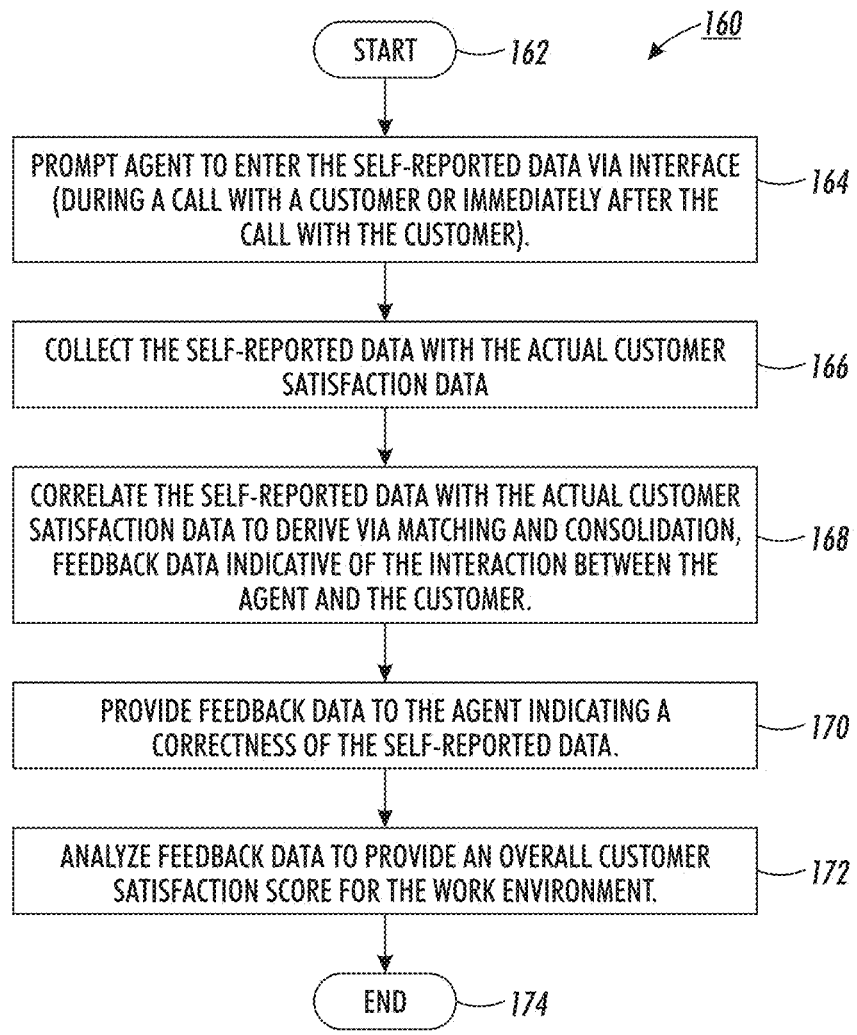
FIG. 6 illustrates a high-level flow chart of operations depicting logical operational steps of a method for determining customer satisfaction in a work environment via prescriptive analytics, in accordance with an alternative embodiment.

FIG. 6 illustrates a high-level flow chart of operations depicting logical operational steps of a method 160 for determining customer satisfaction in a work environment via prescriptive analytics, in accordance with an alternative embodiment. As shown at block 162, the process can be initiated. Thereafter, as depicted at block 164, a step or logical operation can be implemented to prompt an agent to enter self-reported data (e.g., perceived CSAT data 102) via an interface (e.g., interface 120) during a call with a customer or immediately after the call with the customer. Then, as depicted at block 166, an operation can be implemented to collect the self-reported data along with actual customer satisfaction data (e.g., real CSAT data 104), and as depicted at block 168, correlate the self-reported data with the actual customer satisfaction data to derive via matching and consolidation (e.g., module 116) feedback data indicative of the interaction between the agent and the customer. Then, as indicated at block 170, feedback data can be provided to the agent, which indicates a correctness of the self-reported data. The feedback data can also be analyzed as illustrated at block 172 to provide an overall customer satisfaction score for the work environment. The process can then terminate, as shown at block 174.

It can be appreciated based on the foregoing that a number of advantages can accrue in a work environment through implementation of the disclosed embodiments. For example, the Customer Care/Business Process Outsourcing (CBPO) business is a huge business for Xerox, employing 40,000 or more agents in call centers; this is a highly commoditized environment. Although price is still a major differentiation in this market, most of the differentiation today comes from CSAT—a key metric that is often very difficult to measure, estimate, and correct.

CSAT is therefore extremely important for companies to move up the value chain and work with high-end brands which focus on the customer experience—in these contexts margins are typically higher and work needs to be done onshore. With the disclosed embodiments, an organization employing call centers can improve its CSAT in several ways including: by identifying best agents and getting them to train others, and being able to proactively correct recent on calls that did not go well.

As can be appreciated by one skilled in the art, embodiments can be implemented in the context of a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks such as, for example, the instructions discussed and illustrated herein with respect to blocks 162, 164, 166, 168, 170, and 172 in FIG. 6 and elsewhere herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 7:
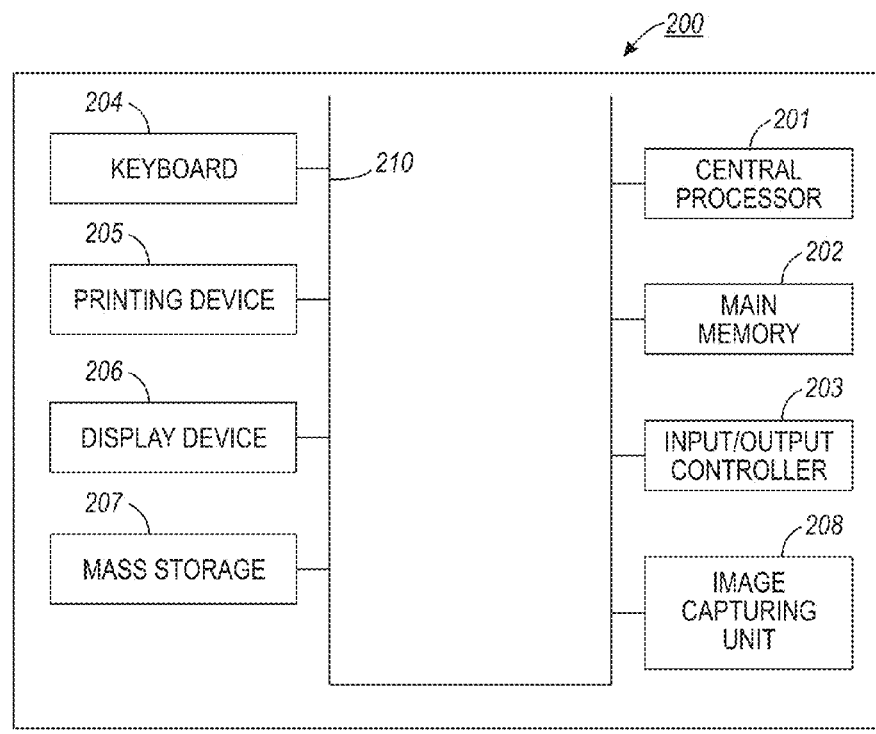
FIG. 7 illustrates a schematic view of a computer system, in accordance with an embodiment.
Figure 8:
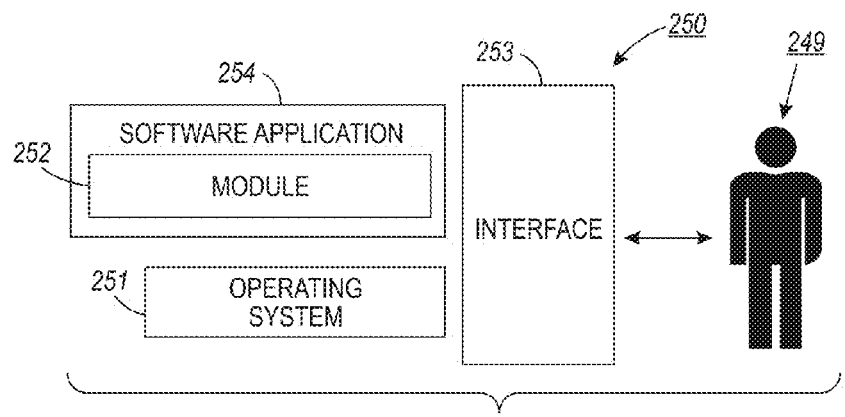
FIG. 8 illustrates a schematic view of a software system including a module, an operating system, and a user interface, in accordance with an embodiment.

FIGS. 7-8 are provided as exemplary diagrams of data-processing environments in which embodiments of the present invention may be implemented. It should be appreciated that FIGS. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, some embodiments may be implemented in the context of a data-processing system 200 that includes, for example, a central processor 201, a main memory 202, an input/output controller 203, a keyboard 204, an input device 205 (e.g., a pointing device, such as a mouse, track ball, and pen device, etc.), a display device 206, a mass storage 207 (e.g., a hard disk), an image capturing unit 208, and a USB (Universal Serial Bus) peripheral connection. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 8 illustrates a computer software system 250 for directing the operation of the data-processing system 200 depicted in FIG. 7. The software application 254 can be stored in the main memory 202 and/or in the mass storage 207. The computer software system 250 generally includes a kernel or operating system 251 and a shell or interface 253. One or more application programs, such as the software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system 251 and/or software application 254.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task such as word processing, accounting inventory management, etc.

The interface 253, which is preferably a graphical user interface (GUI), also serves to display results, whereupon the user may supply additional inputs or terminate the session. In some example embodiments, interface 253 may serve as, for example, interface 120 discussed earlier herein. In an embodiment, operating system 251 and interface 253 can be implemented in the context of a "Windows" system. It can be appreciated, of course, that other types of systems are possible. For example, rather than a traditional "Windows" system, other operation systems such as, for example, Linux may also be employed with respect to operating system 251 and interface 253. The software application 254 can include a module 252 that can, for example, function or actually be the data marketing and consolidation module 116 of system 100. Software application 254, on the other hand, can include instructions, such as the various operations described herein with respect to the various components and modules described herein, such as, for example, blocks 162, 164, 166, 168, 170, 172 and 174 of method 160 depicted in FIG. 6.

FIGS. 7-8 are thus intended as examples and not as architectural imitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed herein. For example, in one embodiment, a method can be implemented for determining customer satisfaction in a work environment via prescriptive analytics. Such a method can include the steps or logical operations of, for example, collecting self-reported data related to a perception of an agent with respect to customer satisfaction in a work environment via an interface that allows the agent to enter the self-reported data regarding the customer satisfaction; correlating the self-reported data with an actual customer satisfaction score associated with the agent to derive data indicative of an interaction between the agent and a customer; and providing feedback data via the interface indicating a correctness of the self-reported data based on correlating the self-reported data with the actual customer satisfaction score.

In another embodiment, a step or logical operation can be implemented for prompting the agent to enter the self-reported data via the interface during a call with the customer or immediately after the call with the customer. In still another embodiment, a step or logical operation can be provided for prompting the agent to enter the self-reported data via the interface during a predetermined time interval. In yet another embodiment, a step or logical operation can be provided for automatically analyzing the feedback data associated with the agent with respect to feedback data associated with at least one other agent to provide an overall customer satisfaction score for the work environment.

In another embodiment, a step or logical operation can be implemented for selecting at least one referee agent associated with the work environment by analyzing the overall customer satisfaction score. In some embodiments, the interface can be implemented as a graphically displayed agent dashboard via a computer display screen such as a monitor.

In another embodiment, steps or logical operations can be provided for prompting the agent to enter the self-reported data via the interface during a call with the customer or immediately after the call with the customer, and prompting the agent to enter the self-reported data via the interface during a predetermined time interval. In yet another embodiment, a step or logical operation can be provided for automatically analyzing the feedback data associated with the agent with respect to feedback data associated with at least one other agent to provide an overall customer satisfaction score for the work environment.

In another embodiment, a system can be implemented for determining customer satisfaction in a work environment via prescriptive analytics. Such a system can include, for example, an interface that allows an agent to enter self-reported data regarding customer satisfaction, wherein the self-reported data is related to a perception of the agent with respect to the customer satisfaction in a work environment; and at least one processor that communicates electronically with the interface, wherein the processor correlates the self-reported data with an actual customer satisfaction score associated with the agent to derive data indicative of an interaction between the agent and a customer; and wherein feedback data is provided via the interface to indicate a correctness of the self-reported data based on correlating the self-reported data with the actual customer satisfaction score.

In some embodiments, the agent can be prompted to enter the self-reported data via the interface during a call with the customer or immediately after the call with the customer. In another embodiment, the agent can be prompted to enter the self-reported data via the interface during a predetermined time interval. In another embodiment, the feedback data associated with the agent with respect to feedback data associated with at least one other agent can be automatically analyzed via the at least one processor to provide an overall customer satisfaction score for the work environment. In another embodiment, at least one referee agent associated with the work environment can be selected by analyzing via the at least one processor the overall customer satisfaction score. In yet another system embodiment, the interface comprises an agent dashboard.

In another embodiment, a processor-readable medium storing code representing instructions to cause a process for determining customer satisfaction in a work environment via prescriptive analytics can be implemented, wherein the code includes code to: collect self-reported data related to a perception of an agent with respect to customer satisfaction in a work environment via an interface that allows the agent to enter the self-reported data regarding the customer satisfaction; correlate the self-reported data with an actual customer satisfaction score associated with the agent to derive data indicative of an interaction between the agent and a customer; and provide feedback data via the interface indicating a correctness of the self-reported data based on correlating the self-reported data with the actual customer satisfaction score.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for determining customer satisfaction in a work environment via prescriptive analytics displayed and manipulated through a graphical user interface, said method comprising:

collecting self-reported data related to a perception of an agent with respect to customer satisfaction in a work environment via a graphical user interface that allows said agent to enter said self-reported data regarding said customer satisfaction, said graphical user interface comprising a graphically displayed agent dashboard that displays said self-reported data for said agent in a graphically displayed circular data pattern in a first display area of said graphical user interface;

correlating said self-reported data with an actual customer satisfaction score associated with said agent to derive data indicative of an interaction between said agent and a customer, wherein said self-reported data is thereafter used to provide feedback data to said agent that is based on said data derived that is indicative of said interaction between said agent and said customer; and providing said feedback data via said graphical user interface in a second display area of said graphical user interface indicating a correctness of said self-reported data in said circular data pattern based on said correlating said self-reported data with said actual customer satisfaction score, wherein said first and second display areas of said graphical user interface facilitate improved processing, manipulation, and interactive display of said prescriptive analytics.

2. The method of claim 1 further comprising prompting said agent to enter said self-reported data via said graphical user interface during a call with said customer or immediately after said call with said customer.

3. The method of claim 1 further comprising prompting said agent to enter said self-reported data via said graphical user interface during a predetermined time interval.

4. The method of claim 1 further comprising automatically analyzing said feedback data associated with said agent with respect to feedback data associated with at least one other agent to provide an overall customer satisfaction score for said work environment.

5. The method of claim 4 further comprising selecting at least one referee agent associated with said work environment by analyzing said overall customer satisfaction score.

6. The method of claim 1 wherein said second display area of said graphical user interface displays a score indicative of interactions between said agent and said customer.

7. The method of claim 1 further comprising:
prompting said agent to enter said self-reported data via said graphical user interface during a call with said customer or immediately after said call with said customer; and
prompting said agent to enter said self-reported data via said graphical user interface during a predetermined time interval.

8. The method of claim 7 further comprising automatically analyzing said feedback data associated with said agent with respect to feedback data associated with at least one other agent to provide an overall customer satisfaction score for said work environment.

9. A system for determining customer satisfaction in a work environment via prescriptive analytics displayed and manipulated through a graphical user interface, said system comprising:
a graphical user interface that allows an agent to enter self-reported data regarding customer satisfaction, wherein said self-reported data is related to a perception of said agent with respect to said customer satisfaction in a work environment, said graphical user interface comprising a graphically displayed agent dashboard that displays said self-reported data for said agent in a graphically displayed circular data pattern in a first display area of said graphical user interface; and
at least one processor that communicates electronically with said interface, wherein said at least one processor correlates said self-reported data with an actual customer satisfaction score associated with said agent to derive data indicative of an interaction between said agent and a customer, wherein said self-reported data is thereafter used to provide feedback data to said agent that is based on said data derived that is indicative of said interaction between said agent and said customer; and wherein said feedback data is provided via said graphical user interface in a second display area of said graphical user interface to indicate a correctness of said self-reported data in said circular data pattern based on said correlating said self-reported data by said at least one processor with said actual customer satisfaction score, wherein said first and second display areas of said graphical user interface facilitate improved processing, manipulation, and interactive display of said prescriptive analytics.

10. The system of claim 9 wherein said agent is prompted to enter said self-reported data via said graphical user interface during a call with said customer or immediately after said call with said customer.

11. The system of claim 9 wherein said agent is prompted to enter said self-reported data via said graphical user interface during a predetermined time interval.

12. The system of claim 9 further comprising wherein said feedback data associated with said agent with respect to feedback data associated with at least one other agent is automatically analyzed via said at least one processor to provide an overall customer satisfaction score for said work environment.

13. The system of claim 12 wherein at least one referee agent associated with said work environment is selected by analyzing via said at least one processor said overall customer satisfaction score.

14. The system of claim 9 wherein said second display area of said graphical user interface displays a score indicative of interactions between said agent and said customer.

15. The system of claim 9 wherein:
said agent is prompted to enter said self-reported data via said graphical user interface during a call with said customer or immediately after said call with said customer; and
said agent is prompted to enter said self-reported data via said graphical user interface during a predetermined time interval.

16. The system of claim 15 wherein at least one referee agent associated with said work environment is selected by analyzing via said at least one processor said overall customer satisfaction score.

17. A non-transitory processor-readable medium storing code representing instructions to cause a process for determining customer satisfaction in a work environment via prescriptive analytics displayed and manipulated through a graphical user interface, said code including code to:
collect self-reported data related to a perception of an agent with respect to customer satisfaction in a work environment via a graphical user interface that allows said agent to enter said self-reported data regarding said customer satisfaction, said graphical user interface comprising a graphically displayed agent dashboard that displays said self-reported data for said agent in a graphically displayed circular data pattern in a first display area of said graphical user interface;
correlate said self-reported data with an actual customer satisfaction score associated with said agent to derive data indicative of an interaction between said agent and a customer, wherein said self-reported data is thereafter used to provide feedback data to said agent that is based on said data derived that is indicative of said interaction between said agent and said customer; and
provide said feedback data via said graphical user interface in a second display area of said graphical user interface indicating a correctness of said self-reported data in said circular data pattern based on said correlating said self-reported data with said actual customer satisfaction score, wherein said first and second display areas of said graphical user interface facilitate improved processing, manipulation, and interactive display of said prescriptive analytics.

18. The non-statutory processor-readable medium of claim 17 wherein said code further includes code to prompt said agent to enter said self-reported data via said graphical user interface during a call with said customer or immediately after said call with said customer.

19. The non-statutory processor-readable medium of claim 17 wherein said code further includes code to prompt said agent to enter said self-reported data via said graphical user interface during a predetermined time interval.

20. The non-statutory processor-readable medium of claim 17 wherein said code further includes code to automatically analyze said feedback data associated with said agent with respect to feedback data associated with at least one other agent to provide an overall customer satisfaction score for said work environment.

* * * * *